United States Patent [19]

Dinter et al.

[11] Patent Number: 4,948,653
[45] Date of Patent: Aug. 14, 1990

[54] HIGH-STRENGTH PANEL-TYPE ARTICLE WITH A TEXTURED SURFACE

[75] Inventors: Peter Dinter, Oestrich-Winkel; Bernd Spross, Taunusstein, both of Fed. Rep. of Germany

[73] Assignee: Hoechst Aktiengesellschaft, Frankfurt am Main, Fed. Rep. of Germany

[21] Appl. No.: 382,891

[22] Filed: Jul. 20, 1989

[30] Foreign Application Priority Data

Aug. 3, 1988 [DE] Fed. Rep. of Germany ....... 3826318

[51] Int. Cl.$^5$ .......................... B32B 3/30; B32B 3/26; B32B 3/28
[52] U.S. Cl. ...................... 428/172; 428/156; 428/166; 428/195; 428/200; 428/206; 428/207; 428/212; 428/213; 428/308.4; 428/304.4; 428/910; 428/349; 428/198; 428/216; 428/516; 428/481; 428/483
[58] Field of Search ............... 428/156, 166, 172, 195, 428/200, 206, 207, 212, 213, 308.4, 304.4, 910, 349, 198, 216, 516, 481, 483

[56] References Cited

U.S. PATENT DOCUMENTS

| 3,294,607 | 12/1966 | Francis et al. | 428/156 X |
| 4,091,137 | 5/1978 | Miller | 428/156 X |
| 4,287,250 | 9/1981 | Rudy | 428/198 X |
| 4,614,680 | 9/1986 | Fry et al. | 428/172 X |
| 4,615,939 | 10/1986 | Corsi et al. | 428/172 X |
| 4,748,072 | 5/1988 | Schobermayr | 428/212 |

FOREIGN PATENT DOCUMENTS

| 2844612 | 4/1980 | Fed. Rep. of Germany | 428/156 |
| 2119707 | 4/1983 | United Kingdom | 428/200 |
| 2187136 | 9/1987 | United Kingdom | 428/198 |

Primary Examiner—Ellis P. Robinson
Assistant Examiner—William P. Watkins, III
Attorney, Agent, or Firm—Foley & Lardner, Schwartz, Jeffery, Schwaab, Mack, Blumenthal & Evans

[57] ABSTRACT

The high-strength panel-type article is composed of a plurality of superposed films of thermoplastic material firmly bonded to one another. At least one surface of the article has a plurality of individual elevations, the article being thicker in these areas of this surface and the individual films not being bonded to one another in these areas.

14 Claims, 1 Drawing Sheet

HIGH-STRENGTH PANEL-TYPE ARTICLE WITH A TEXTURED SURFACE

BACKGROUND OF THE INVENTION

The present invention relates to a high-strength panel-type article and to a process for manufacturing the same.

Films and panel-type articles are two of the most important forms in which plastics are produced as semi-finished products. While in film production monoaxial or biaxial drawing is used industrially to improve the mechanical properties, drawing is hardly used at all in panel manufacture. The chief reasons for this are the problems directly connected with the panel thickness, namely, on the one hand, of mechanically controlling in the drawing means the drawing forces which increase with increasing substrate thickness, and on the other, of ensuring the homogeneous overall heating of the sheets required for uniform drawing. However, commercially there is certainly a large demand for high-strength plastic sheets.

A contribution to solving this problem is provided by the process described in EP-A-0,207,047, which provides for the production of high-tenacity panels of high tensile strength by thermal compression of a plurality of biaxially oriented, coextruded plastic films. The panels obtained are in themselves homogeneous and have smooth, even surfaces.

SUMMARY OF THE INVENTION

Accordingly, it is an object of the present invention to provide a high-strength panel-type article made from thermally compressed films with at least one textured, decorative surface, which has good mechanical properties.

Another object of the present invention is to provide a process for producing the aforementioned panel-type article.

In accomplishing the foregoing objectives, there has been provided, in accordance with one aspect of the present invention, a high-strength panel-type article which comprises a plurality of superposed thermoplastic films which are firmly bonded to one another by local compression, wherein at least one surface of the article has a plurality of uncompressed individual elevations, in the areas of which the films are not bonded to one another, and wherein the article displays increased thickness in the areas of the elevations.

In accordance with another aspect of the present invention there is provided a process for producing a panel-type article as described above, which comprises the steps of superposing a plurality of thermoplastic films to form a pile, placing the pile between two compression molds at least one of which comprises a plurality of recesses in the region of which no pressure or reduced pressure is exerted on the corresponding surface of the pile during compression, and compressing the pile at elevated temperature.

Other objects, features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawing by which

DETAILED DESCRIPTION OF THE PREFERRED EMBODIMENTS

Figure 1:
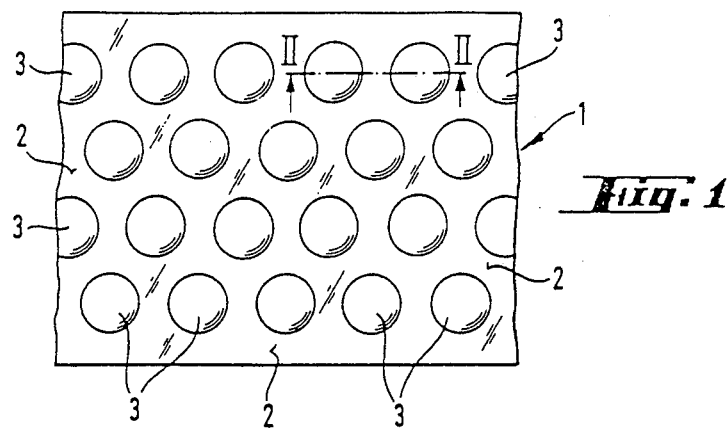
FIG. 1 shows an embodiment of the panel-type article according to the invention in plan view.

A panel-type article is a sheet whose width and length are relatively large in relation to its thickness. The two surfaces defined by the width and length of the panel extend parallel to each other and are flat or have a curved, for example corrugated or angled, shape. On at least one of these two surfaces there is a plurality of individual elevations, which form the profiled surface texture and consist of uncompressed areas in which the individual superposed films have not been bonded to one another. It is, however, a prerequisite for mechanical strength that these uncompressed areas do not extend all the way from one edge of the panel-type article to the other edge. The panel would then sag through in this area. If, therefore, the uncompressed areas are in the form of lines or stripes, their length must be considerably shorter than the width or length of the panel; that is, every linelike or stripelike uncompressed area should not extend to more than about 70%, in particular 50%, of the width of the panel. The shape of the uncompressed areas and their mutual spacing are basically freely choosable, as long as the strength of the panel is not overly reduced. In a preferred embodiment, the uncompressed areas are circular or elliptical or have a rectangular shape, in which case the corresponding elevations are in the shape of spherical segments or of half a pillow which bulge out of the surface of the panel-type article.

Similarly, the ratio of the total uncompressed area to the particular total surface area of the article is important for the mechanical stability and stiffness thereof. The uncompressed areas, i.e. the areas in which the elevations bulge out of the panel surface, as a proportion of the total area of the particular surface should be less than 70%, in particular equal to or less than about 60%, based on the total area of the surface of which the uncompressed areas form part. If the ratio of the total compressed area to the total uncompressed area is designated v, then $\dot v$ preferably should not be less than a minimum value of about 0.7, each of the uncompressed areas itself being very small, preferably not more than about 0.25 to 1 cm$^2$, and being a minimum of about 2 mm spaced apart from the others. Square or circular uncompressed areas should not exceed a diameter or edge length of greater than half the width of the article, since otherwise the strength of the article is overly reduced.

The thickness of the panel depends on its intended use. It can have for example a thickness of less than 1 mm, in particular down to 0.3 mm, provided its strength is sufficient. The upper thickness limit is determined by the manufacturing conditions, since it is then necessary to thermocompress a correspondingly deeper pile of films. This requires longer heating-up times. However, it has been found that even panels from 30 to 50 mm in thickness are still producible.

In the process according to the invention, the biaxially oriented plastic films to be compressed, which have been equipped on at least one side with a heat-sealing layer by coextrusion, are arranged in a pile. The individual films are arranged on top of one another with their orientation, imparted by drawing, parallel or offset relative to the adjacent film. The resulting pile of films is partially, i.e. locally, compressed at elevated temperatures in a suitable embossing press between two press plates, of which at least one is equipped with an appropriately textured embossing mold. This embossing compression mold has, according to the desired number of elevations to be created, a corresponding number of recesses in whose region virtually no pressure is exerted on the pile of films during thermal compression and into which the pile of films escapes to form elevations.

The molding temperature is within the range above the crystalline melting point or the glass transition temperature of the thermoplastic polymer forming the heat-sealing layer and below the corresponding temperature of the thermoplastic polymer forming the base layer, in general at 130 to 150° C. in the case of polypropylene films. On reaching the molding temperature, the heat-sealing layer on the films starts to become tacky, while the drawing-imparted orientation of the base layer still survives at that temperature. The pressure should be not less than 10 bar and will in practice not exceed 50 bar. The duration of the molding pressure depends on the thickness of the individual films, the depth of the pile of films and the heat conductivity of the films, and ranges from a few seconds up to half an hour or longer. The number of superposed films required depends on the film thickness and the desired panel thickness.

Besides the texturing by the partial compressing of the pile of films it is additionally possible to confer a microtexture, for example increased roughness or patterning, on the surface of the panel-type article in the compressed area. In addition or alternatively it is also possible to shape the entire pile of films, producing for example a panel having a corrugated shape.

The advantages of the partial compressing of the pile of films according to the invention to give a high-strength molding lie in the following points: in the region of the uncompressed areas the panel-type article has imparted to it relieflike surface areas which bulge outward and which, owing to their altered transparency and their increased brightness, confer a decorative pattern on the structure. These elevations additionally have a functional character in that they improve for example the antislip properties of the surface and alter the reflectivity.

Compressing a pile of opaque films whose opacity is the result of filler particles or pigments gives particularly interesting effects. This effect is particularly impressive if the film additionally contains vacuoles formed on drawing the particle-containing base layer. On compressing such films in partial areas, the vacuoles in those areas are removed as a result of the polymer matrix being compacted. The opacity is distinctly lower in the compressed areas, and the film becomes partially translucent and matt in those areas. A bonded article made from opaque films having a porous structure by only partial compression according to the invention comprises compressed, matt, translucent areas and opaque, pearlescent, uncompressed areas in which the porous structure of the superposed films is preserved. Furthermore, the opaque areas are much thicker than the surrounding compressed areas, so that the result is a relieflike surface profile.

A further appreciable advantage of partial compression is obtained in relation to the fracture mechanics of the resulting article. On the matter of crack propagation in homogeneous materials it is known that the continuation of a damaging process, for example the propagation of a tear already present, generally requires less force than the force required for initiating the damage, i.e. the initial tear. The incorporation in the article according to the invention of dislocations in the form of uncompressed areas which stop crack formation has proved in the present case to be an effective measure for overcoming and distinctly improving the crack propagation characteristics under the action of impact and collision energy, substantially reducing in particular the risk of crack spreading.

Suitable materials for producing the multilayer article according to the invention are thermoplastics films which have been biaxially, i.e. longitudinally and transversely, oriented by drawing. The films have a base layer and at least one outer cover layer of heat-sealable material, which have been coextruded. It is particularly advantageous to use films having a base layer made of a thermoplastic from the group of the polyesters and the polyolefins. Polyester films are customarily draw-oriented in both directions in a ratio of from 1:2.5 to 1:3.5, while polyolefin films, in particular those based on polypropylene, are customarily draw-oriented in the longitudinal direction in a ratio of from 1:3 to 1:6 and in the transverse direction in a ratio of from 1:8 to 1:12. The aforementioned polymers may include inorganic or organic additives in their formulation to accentuate certain performance characteristics.

Polyesters are to be understood as meaning polyester homopolymers and copolymers, mixtures of various polyesters and blends of polyesters with other polymers.

Examples of polyesters are mono- or polycondensates of terephthalic acid, isophthalic acid and/or 2,6-naphthalenedicarboxylic acid with glycols of 2 to 10 carbon atoms, such as polyethylene terephthalate, polytetramethylene terephthalate, polybutylene terephthalate, poly-1,4-cyclohexylenedimethyleneterephthalate, polyethylene 2,6-naphthalenedicarboxylate and polyethylene p-hydroxybenzoate.

The copolyesters may also contain as building blocks adipic acid, sebacic acid, phthalic acid, isophthalic acid, 5-Na-sulfoisophthalate, polyfunctional components such as trimellitic acid and the like.

The polyester mixtures may comprise, for example, polyethylene terephthalate and polybutylene terephthalate or polyethylene terephthalate and at least one alkali metal salt of a derivative of sulfonic acid, for example of sulfoisophthalic acid.

Examples of the polymers which can be incorporated or mixed into the polyesters are polyolefin homopolymers or copolymers such as polyethylene, polypropylene, poly-4-methylpentene, ethylene/vinyl acetate copolymers, which in turn can be hydrolysed, and ionomers, and also polyamides, polycarbonates, polytetrafluoroethylene, polysulfones and the like.

Suitable polyolefins for the base layer are homopolymers, copolymers or terpolymers of alpha-olefins of 2 to 6 carbon atoms or mixtures thereof, in particular propylene homopolymers or propylene copolymers with ethylene and/or alpha-olefins of 4 to 6 carbon atoms. The proportion of propylene homopolymer is preferably not less than about 80% by weight, in particular not less than 90% by weight, based on the polymer mixture.

The heat-sealing layers used can be the coatings customarily used for this purpose in film production. In the case of base layers made of polyolefins they are preferably random copolymers or terpolymers of alpha-olefins of 2, 3 and/or 4 carbon atoms, and in the case of base layers made of polyesters they are preferably copolyesters containing ethylene, terephthalate and isophthalate units.

If opaque films are used to manufacture the panel-type article, then the base layer and optionally also the cover layers contain inert additives in the form of finely divided particles. The proportion of these particles is usually within the range from about 1 to 25, in particular from 5 to 15, % by weight, based on the film weight. The average particle size is about 0.03 to 4, in particular 0.3 to 1, micrometers.

The inert additive consists of pulverulent inorganic solid particles, preferably comprising carbonates, in particular of the alkali metal and alkaline earth metals, such as calcium carbonate (chalk), sulfates such as barium sulfate and/or oxides such as inorganic silicon compounds, in particular magnesium silicate (talc), Na/Al silicate, silicon dioxide and glass or titanium dioxide, or mixtures thereof. They are incorporated in the form of fine particles, for example as powders or pigments, into the plastic melt which will form the base layer as the film is being extruded and are dispersed therein. It is particularly advantageous to incorporate the inert articles and the other additives into the base layer by the masterbatch technique.

In another embodiment, the inert additive consists of organic plastics particles which are incompatible with the polymers of the base layer and of the cover layers and have a higher melting point. These polymers include styrene and acrylic polymers, in particular polystyrene and polymethyl methacrylate, fluorinated hydrocarbon polymers and polyamides.

In a preferred embodiment, the base layer has a porous structure. As a result, the film has a density which is less than the purely arithmetical density from the mixture of base layer plastic and inert particles used. More particularly, its density is 0.50 to 0.85 g/cm$^3$. It is true that if the density is higher the strength of film is higher, but an increasing number of vacuoles, i.e. a lower density, is found to give better embossability. The porous structure results from microcracks, holes, microvoids or vacuoles formed in the course of drawing the coextruded film. This drawing takes place under temperature conditions at which the polymer matrix of the base layer cracks at the surface of the inert particles, forming free, empty, unfilled spaces (holes, microvoids, vacuoles) in the film. By increasing the concentration of solid particles it is possible to increase the number of holes and hence to reduce the density of the film.

The individual layers of film of the compression-molded laminate forming the article according to the invention usually have a thickness within the range from about 10 to 300, preferably from 40 to 200, micrometers. The thickness of the heat-sealing layer usually does not exceed 10% of the thickness of the film and is preferably about 0.3 to 5, in particular 0.5 to 2.5, micrometers. The heat-sealing layer is present only on one surface of the base layer, provided that compressing the pile of films between the heat-sealing layer and the adjoining base layer of the adjacent film gives rise to a sufficiently firm bond. Usually, however, films having a heat-sealing layer on both sides are used.

The layers of the film may contain useful additives such as antioxidants, antistats and/or stabilizers in effective amount.

The panel-type article which has a textured or relief-like profile on its surface is particularly suitable for use as a decorative or relief panel for interior construction, for example in the sanitary sector (shower cubicle walls), for the furniture industry, for floor elements or for the construction of exhibition stands, for exterior uses in the building industry, such as exterior facings, and in vehicle construction, i.e. in the manufacture of automotive vehicles, buses, railroad cars, aircraft and ships. If necessary, the outer surface is provided with a fire-resistant, weathering-resistant and/or chemical-resistant coating. It is also possible to incorporate appropriate agents, for example UV stabilizers, into the films. Again, if necessary, the panel-type article is provided with reinforcement, for example by lamination with an appropriate panel or film, for example made of metal, plastics or wood, or a woven or nonwoven fabric, but it can also be used as a self-supporting panel.

Figure 2:
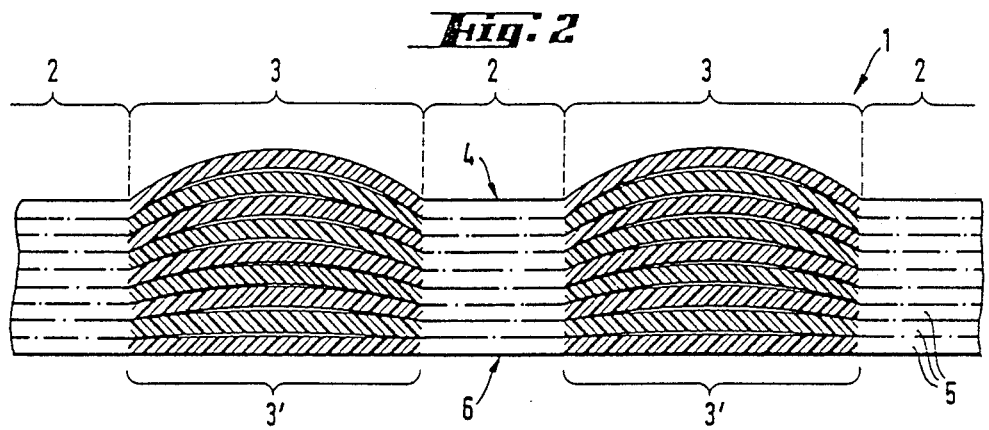
FIG. 2 shows a section through the embodiment of FIG. 1 along the line II—II in greater detail and on an enlarged scale.

Turning now to the drawings, the panel-type article of FIG. 1 comprises a plurality of superposed, biaxially oriented films 5 (FIG. 2). The films 5 consist of a base layer (not depicted) and heat-sealable cover layers on both sides (not shown). They have been joined to one another by compression at elevated temperature. The mold used for obtaining partial compression is in the simplest case a commercially available steel plate with round perforations. In accordance with the shape of the chosen compression mold, the article 1 has areas 2 which have been locally compressed to form a homogeneous polymer matrix and uncompressed areas 3 which, as shown in FIG. 2, clearly bulge out of the surface 4 of the article 1 as spherical segments and confer on the surface 4 a relieflike texture.

FIG. 2 illustrates the layered structure of an article 1 obtained by partial compression molding with a perforated and with a plain, smooth uninterrupted compression mold. Article 1 consists of a plurality of film plies 5, a planar, smooth surface 6 and, parallel thereto, a surface 4 which has elevations in the areas 3. The planar surface 6 is the result of placing the pile of films on the pressplate without interruptions, while the texture of the surface 4 is the result of contact with the perforated plate. On compression in a hydraulic press at elevated temperatures, the pile of films being pressed together undergoes compression in the areas 2, which are coincident with the webs of the perforated plate, to form a homogeneous polymer matrix. In the areas 3, which coincide with the holes in the compression mold, the molding pressure does not come into effect, so that there the pile of films retains it original thickness and appears to expand and escape into the holes of the perforated plate in the course of compression. The film plies are not bonded to one another in the areas 3 and distinctly bulge out of the surface 4. It is true that there are no corresponding elevations on the opposite surface 6, but this surface likewise shows in the corresponding area 3' a reduced degree of transparency and increased brightness, so that the article also displays a decorative effect on the smooth, planar surface.

Figure 3:
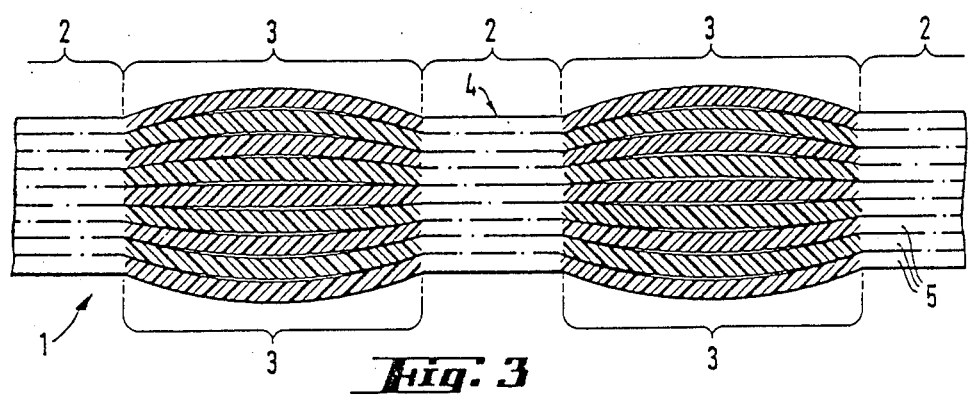
FIG. 3 shows a further embodiment in section.

FIG. 3, in which the same reference numerals are used, shows the layered structure of a composite panel which, compared with the embodiment of FIG. 2, has profiling on both sides. Such a panel 1 is obtained by compressing the pile of films from both sides with a perforated plate on each side. If identical perforated plates are placed on the pile of films in complete congruence, the products are inevitably composites having identical and congruent profilings on both sides. If, by contrast, the two perforated plates are displaced laterally relative to each other, it is possible to form offset textures on the two surfaces of the molded article. If the pile of films is compressed with two completely differently textured perforated plates, for example with plates having round and square and/or differently sized perforations, it is also possible to manufacture articles having differently profiled surfaces.

It is within the purview of the present invention, without any detailed description having to be provided, that by choosing suitable compression molds, for example positive molds instead of negative molds, it is possible to obtain any desired surface profilings.

What is claimed is:

1. A high-strength panel-type article which comprises a plurality of superposed thermoplastic films comprising at least one heat-sealing layer and a base layer, said films being firmly bonded to one another by local compression, wherein at least one surface of said article has a plurality of uncompressed individual elevations, in the areas of which said films are not bonded to one another wherein the total uncompressed area of said surface does not exceed 70% of the total area of said surface and wherein said article displays increased thickness in the areas of said elevations.

2. A panel-type article as claimed in claim 1, wherein both surfaces comprise a plurality of uncompressed individual elevations.

3. A panel-type article as claimed in claim 2, wherein the compressed and uncompressed areas of both surfaces are congruent.

4. A panel-type article as claimed in claim 1, wherein said uncompressed areas are circular, elliptical or rectangular.

5. A panel-type article as claimed in claim 1, wherein the total uncompressed area of said surface does not exceed 60% of the total area of said surface.

6. A panel-type article as claimed in claim 1, wherein each of said uncompressed areas is about 0.25 to 1 $cm^2$ and wherein said uncompressed areas are spaced at least about 2 mm apart.

7. A panel-type article as claimed in claim 1, wherein said films are opaque.

8. A panel-type article as claimed in claim 1, wherein said base layers comprise a polyester, a polyolefin, polystyrene, a polyamide, polyvinyl acetate or a copolymer or mixture thereof.

9. A panel-type article as claimed in claim 8, wherein said base layer comprises polyethylene terephthalate, polypropylene or a propylene copolymer or terpolymer with ethylene or one or more alpha-olefins having 4 to 6 carbon atoms.

10. A panel-type article as claimed in claim 8, wherein said base layer comprises particles of an inert material.

11. A panel-type article as claimed in claim 8, wherein said base layer has a porous structure.

12. A panel-type article as claimed in claim 1, wherein said thermoplastic films have a thickness of about 10 to 300 $\mu$m.

13. A panel-type article as claimed in claim 12, wherein said thermoplastic films have a thickness of about 40 to 200 $\mu$m.

14. A panel-type article as claimed in claim 1, wherein said thermoplastic films are biaxially oriented.

* * * * *